(12) United States Patent
Kuo

(10) Patent No.: US 9,609,631 B2
(45) Date of Patent: Mar. 28, 2017

(54) WIRELESS COMMUNICATION APPARATUSES AND RELATED METHODS

(75) Inventor: Chun-Ming Kuo, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 469 days.

(21) Appl. No.: 13/610,893

(22) Filed: Sep. 12, 2012

(65) Prior Publication Data

US 2013/0188568 A1    Jul. 25, 2013

Related U.S. Application Data

(60) Provisional application No. 61/589,057, filed on Jan. 20, 2012, provisional application No. 61/599,109, filed on Feb. 15, 2012.

(51) Int. Cl.
*H04W 72/04* (2009.01)
*H04W 52/02* (2009.01)

(52) U.S. Cl.
CPC ....... *H04W 72/04* (2013.01); *H04W 52/0212* (2013.01); *H04W 52/0229* (2013.01); *Y02B 60/50* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 6,628,673 B1 * | 9/2003 | McFarland et al. | 370/481 |
| 8,503,297 B1 * | 8/2013 | Vargantwar | 370/230.1 |
| 9,055,481 B1 * | 6/2015 | Yu | H04L 47/10 |
| 2002/0090008 A1 * | 7/2002 | Cioffi | H04L 7/0008 |
| | | | 370/503 |
| 2004/0109419 A1 * | 6/2004 | Sano | H04B 1/7136 |
| | | | 370/320 |
| 2006/0280262 A1 | 12/2006 | Malladi | |
| 2007/0245382 A1 * | 10/2007 | Doi | H04H 20/30 |
| | | | 725/55 |
| 2008/0069200 A1 * | 3/2008 | Dateki | 375/240 |
| 2008/0075109 A1 * | 3/2008 | Zangi | 370/458 |
| 2008/0220788 A1 | 9/2008 | Stanwood | |
| 2010/0040166 A1 * | 2/2010 | Xin | H04L 25/0226 |
| | | | 375/267 |

(Continued)

FOREIGN PATENT DOCUMENTS

| | | |
|---|---|---|
| CN | 101166058 A | 4/2008 |
| CN | 101465690 A | 6/2009 |

*Primary Examiner* — Hassan Phillips
*Assistant Examiner* — Prenell Jones
(74) *Attorney, Agent, or Firm* — Winston Hsu; Scott Margo (57) ABSTRACT

An embodiment of the invention provides a method to be performed by a first wireless communication apparatus in communicating with a second wireless communication apparatus. First, the first wireless communication apparatus determines whether a plurality of sub-channels are simultaneously available for the second wireless communication apparatus. Then, the first wireless communication apparatus simultaneously uses the sub-channels to transmit a plurality of divergent copies of a data segment to the second wireless communication apparatus, respectively, if the sub-channels are simultaneously available for the second wireless communication apparatus.

19 Claims, 10 Drawing Sheets

(56) References Cited

U.S. PATENT DOCUMENTS

| | | | |
|---|---|---|---|
| 2010/0080312 A1* | 4/2010 | Moffatt | H04B 1/713 375/260 |
| 2011/0190017 A1* | 8/2011 | Kwon | H04W 52/146 455/509 |
| 2012/0220292 A1* | 8/2012 | Yu et al. | 455/424 |
| 2012/0244817 A1* | 9/2012 | Das et al. | 455/67.11 |
| 2013/0163443 A1* | 6/2013 | Liberg et al. | 370/252 |
| 2013/0272273 A1* | 10/2013 | Lopez et al. | 370/336 |

\* cited by examiner

First example

|                    | Time slot x of Frame y | Time slot x of Frame y+1 | Time slot x of Frame y+2 | Time slot x Frame y+3 |
|---|---|---|---|---|
| First sub-channel  | Data piece 0 | Data piece 1 | Data piece 2 | Data piece 3 |
| Second sub-channel | Data piece 2' | Data piece 3' | Data piece 0' | Data piece 1' |

Second example

|                    | Time slot x of Frame y | Time slot x of Frame y+1 | Time slot x of Frame y+2 | Time slot x Frame y+3 |
|---|---|---|---|---|
| First sub-channel  | Data piece 0 | Data piece 1 | Data piece 2 | Data piece 3 |
| Second sub-channel | Data piece 2' | Data piece 3' | Data piece 1' | Data piece 0' |

Third example

|                    | Time slot x of Frame y | Time slot x of Frame y+1 | Time slot x of Frame y+2 | Time slot x Frame y+3 |
|---|---|---|---|---|
| First sub-channel  | Data piece 0 | Data piece 1 | Data piece 2 | Data piece 3 |
| Second sub-channel | Data piece 3' | Data piece 2' | Data piece 0' | Data piece 1' |

Fourth example

|                    | Time slot x of Frame y | Time slot x of Frame y+1 | Time slot x of Frame y+2 | Time slot x Frame y+3 |
|---|---|---|---|---|
| First sub-channel  | Data piece 0 | Data piece 1 | Data piece 2 | Data piece 3 |
| Second sub-channel | Data piece 3' | Data piece 2' | Data piece 1' | Data piece 0' |

FIG. 4

|  | Time slot x of Frame y | Time slot x of Frame y+1 | Time slot x of Frame y+2 | Time slot x Frame y+3 |
|---|---|---|---|---|
| First sub-channel | Data piece 0 | | Data piece 2 | |
| Second sub-channel | Data piece 2' | | Data piece 0' | |

WIRELESS COMMUNICATION APPARATUSES AND RELATED METHODS

CROSS REFERENCE TO RELATED APPLICATIONS

This application claims the benefit of U.S. provisional application No. 61/589,057 (filed on Jan. 20, 2012) and U.S. provisional application No. 61/599,109 (filed on Feb. 15, 2012), which are incorporated herein by reference.

BACKGROUND

1. Technical Field

The invention relates generally to wireless communications, and more particularly, to wireless communication apparatuses and methods that allow multiple sub-channels to be used simultaneously.

2. Related Art

Generally speaking, mobile communication apparatuses in wireless communication networks use batteries as their sources of energy. It is thus desired that a mobile communication apparatus consumes as less energy as possible, so as to prolong its battery life. Furthermore, because a wireless communication network likely has only a few wireless channels available, it's desired that the each of the available channels be used efficiently. Therefore, an invention that may reduce mobile communication apparatuses' power consumption and/or allow wireless channels to be used more efficiently is likely a valuable invention.

SUMMARY

A first embodiment of the invention provides a method to be performed by a first wireless communication apparatus in communicating with a second wireless communication apparatus. First, the first wireless communication apparatus determines whether a plurality of sub-channels are simultaneously available for the second wireless communication apparatus. Then, the first wireless communication apparatus simultaneously uses the sub-channels to transmit a plurality of divergent copies of a data segment to the second wireless communication apparatus, respectively, if the sub-channels are simultaneously available for the second wireless communication apparatus.

A second embodiment of the invention provides a method to be performed by a second wireless communication apparatus in communicating with a first wireless communication apparatus. First, the second wireless communication apparatus determines whether the first wireless communication apparatus simultaneously uses a plurality of sub-channels to transmit a plurality of divergent copies of a data segment to the second wireless communication apparatus, respectively. Then, the second wireless communication apparatus recreates the data segment based on data received through the sub-channels if the first wireless communication apparatus simultaneously uses the sub-channels to transmit the divergent copies of the data segment to the second wireless communication apparatus, respectively.

A third embodiment of the invention provides a wireless communication apparatus for communicating with a remote wireless communication apparatus. The wireless communication apparatus includes a radio front-end receiver, a baseband demodulator, and a channel decoder. The radio front-end receiver is configured to generate a plurality of modulated signals by down-converting a plurality of received RF signals. The baseband demodulator is coupled to the radio front-end receiver and is configured to recreate a data segment of encoded bits based on the modulated signals if the modulated signals represent a plurality of divergent copies of the data segment. The channel decoder is coupled to the baseband demodulator and is configured to decode the data segment.

A fourth embodiment of the invention provides a wireless communication apparatus for communicating with a remote wireless communication apparatus. The wireless communication apparatus includes a radio front-end receiver, a baseband demodulator, and a channel decoder. The radio front-end receiver is configured to generate a plurality of modulated signals by down-converting a plurality of received RF signals. The baseband demodulator is coupled to the radio front-end receiver and is configured to recreate a data segment of encoded bits based on the modulated signals if the modulated signals represent a plurality of divergent copies of the data segment. The channel decoder is coupled to the baseband demodulator and is configured to decode the data segment.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
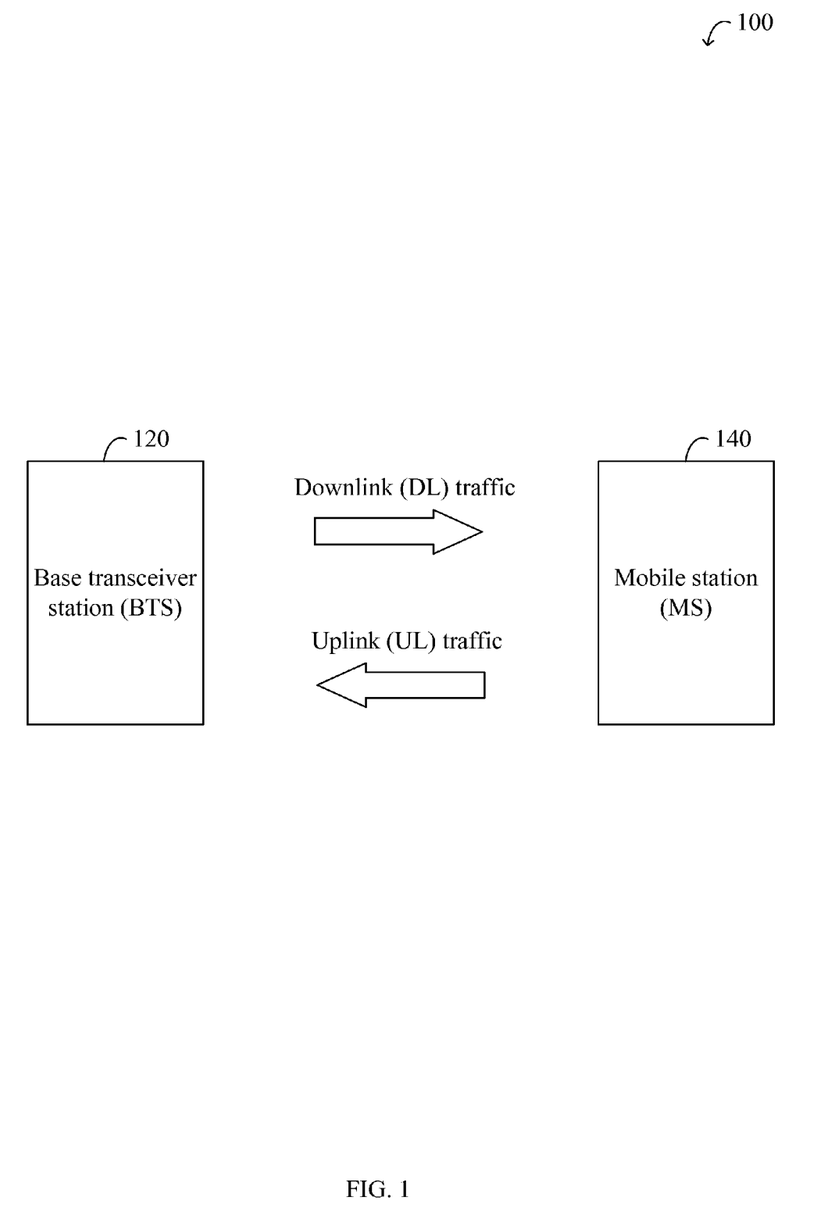
FIG. 1 shows a simplified schematic diagram of a wireless communication network according to an embodiment of the invention.

FIG. 1 shows a simplified schematic diagram of a wireless communication network 100 according to an embodiment of the invention. As an example, the wireless communication network 100 may be a GSM (Global System for Mobile communications) network that is compatible with the VAMOS (Voice services over Adaptive Multi-user channels on One Slot) feature. The wireless communication network 100 includes a plurality of wireless communication apparatuses, only two of which are depicted in FIG. 1. The two depicted apparatuses include a base transceiver station (BTS) 120 and a mobile station (MS) 140. Because they may communication wirelessly, each of these two wireless communication apparatuses may be referred to as a remote wireless communication apparatus of the other. As FIG. 1 indicates, traffic transmitted from the BTS 120 to the MS 140 may be referred to as downlink (DL) traffic, while traffic transmitted from the MS 140 to the BTS 120 may be referred to as uplink (UL) traffic. Although UL traffic may also apply the concepts of the invention, this detailed description will use only DL traffic to explain the concepts.

One of the characteristics of the wireless communication network 100 is that it may allow multiple sub-channels to be used simultaneously to convey data (e.g. voice data or another type of data) from the BTS 120 to the MS 140. The multiple sub-channels may share a same carrier frequency.

As an example, the BTS 120 may use a first sub-channel and a second sub-channel to transmit data to the MS 140 simultaneously. For example, the first and second sub-channels may be an in-phase sub-channel and a quadrature-phase sub-channel of AQPSK (Adaptive Quadrature Phase Shift Keying) modulation. Aside from being used by the MS 140 alone rather than by the MS 140 and another mobile station separately, these two sub-channels are similar to two VAMOS sub-channels. As another example, the first sub-channel may be realized by a first antenna of the BTS 120 and a first antenna of the MS 140, while the second sub-channel may be realized by a second antenna of the BTS 120 and a second antenna of the MS 140. The MS 140 may need to exclude the cross interference between the first and second sub-channels.

Figure 2:
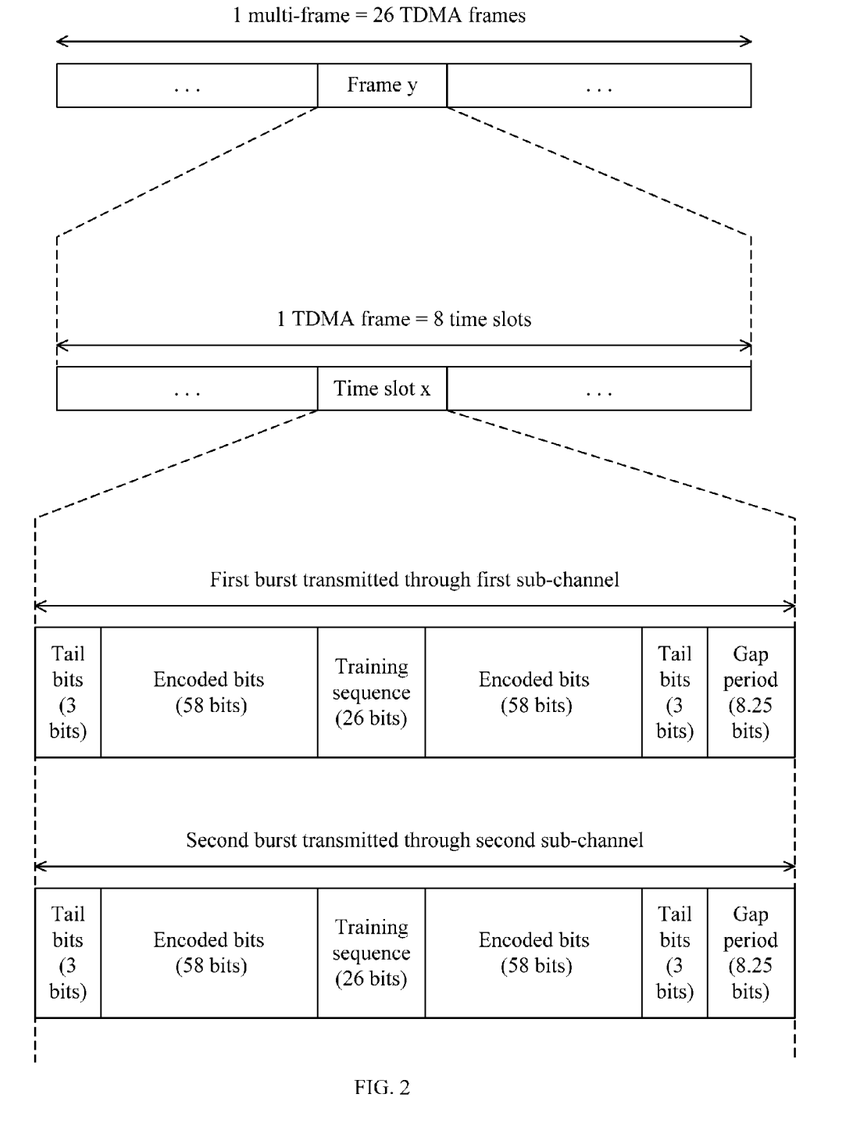
FIG. 2 shows a simplified schematic diagram illustrating how a first and a second sub-channel may be used simultaneously to convey divergent copies of a data segment from one of the two apparatuses of FIG. 1 to the other.

FIG. 2 shows a simplified schematic diagram illustrating how the first and second sub-channels may be used simultaneously to convey data from the BTS 120 to the MS 140. The BTS 120 may use a single carrier frequency to transmit a multiframe to the MS 140 and some other mobile stations. The multiframe may include 26 TDMA (Time Division Multiple Access) frames; each of the TDMA frames may be divided into 8 time slots, including slot number 0 to slot number 7. In FIG. 2, slot number x is used by the MS 140 alone, where x is an integer between 0 and 7. The other 7 slot numbers may be used by other mobile stations. For example, the MS 140 may use slot number x alone if the BTS 120 assigns slot number x to MS 140 exclusively, or if the BTS 120 assigns slot number x to MS 140 and another mobile station but the latter currently has no DL traffic to receive.

The MS 140 may be said to have discontinuous reception (DRX) because it only needs to receive slots of slot number x but not slots of other slot numbers. Therefore, the DRX feature allows the MS 140 to have a relatively smaller receiver duty cycle and hence to extend its battery life. As FIG. 2 indicates, each time slot x may accommodate two bursts, a first burst transmitted through the first sub-channel and a second burst transmitted through the second sub-channel. Each of the bursts may be a normal burst that contains 58+58=116 encoded bits for the MS 140.

Figure 3:
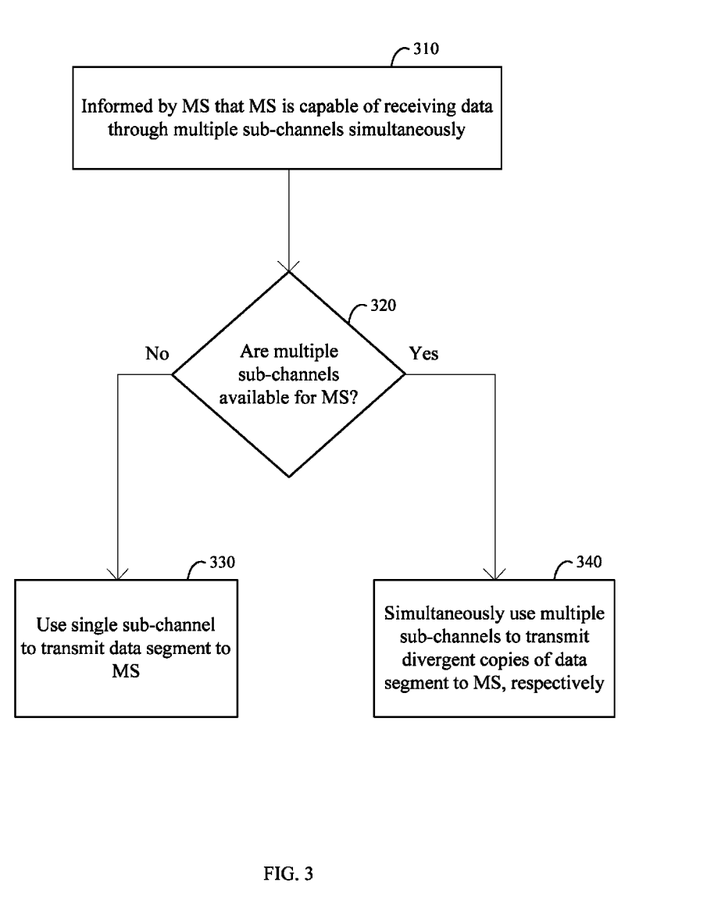
FIG. 3 and FIG. 6 show two simplified flowcharts of methods performed by the two apparatuses of FIG. 1, respectively.

FIG. 3 shows a simplified flowchart of a method performed by the BTS 120. This simplified flowchart includes only those steps that are substantially related to the invention; other steps are omitted therefrom to avoid distraction. First, at step 310, the BTS 120 is informed by the MS 140 that the latter is capable of receiving data through a plurality of sub-channels simultaneously. For example, step 310 may be performed during a camp-on procedure between the MS 140 and the BTS 120. In addition, the BTS 120 may pass this information to a transmitter protocol layer of radio resource management (RRM).

Then, at step 320, the BTS 120 determines whether multiple sub-channels are available for the MS 140 simultaneously. If the answer is no, the BTS 120 enters step 330; otherwise, it enters step 340. Using FIG. 2 as an example, the multiple sub-channels may include the first and second sub-channels of slot number x. Some exemplary situations that will lead the BTS 120 to step 340 include the situation that slot number x is assigned to the MS 140 exclusively, and the situation that slot number x is assigned to the MS 140 and another mobile station but the latter currently has no DL data to receive. One of the advantages of step 340 is that it may reduce the idle time of the two sub-channels and allows the two sub-channels to be used more efficiently.

At step 330, the BTS 120 uses a single sub-channel, instead of multiple sub-channels, to transmit a data segment to the MS 140. For example, the BTS 120 may follow the specifications of VAMOS and simultaneously use the first sub-channel of slot number x to transmit the data segment to the MS 140 and the second sub-channel of slot number x to transmit another data segment to another mobile station, respectively.

At step 340, BTS 120 simultaneously uses the multiple sub-channels to transmit divergent copies of a data segment to the MS 140, respectively. For example, the data segment may contain a first half and a second half. The multiple copies may contain a first copy and a second copy. The first copy may contain the first half and then the second half of the data segment; the second copy may contain the second half and then the first half of the data segment. The BTS 120 may first use the first and second sub-channels to transmit the first and second halves of the data segment, respectively, to the MS 140. Then, the BTS 120 may use the first and second sub-channels to transmit the second and first halves of the data segment, respectively, to the MS 140.

Figure 4:
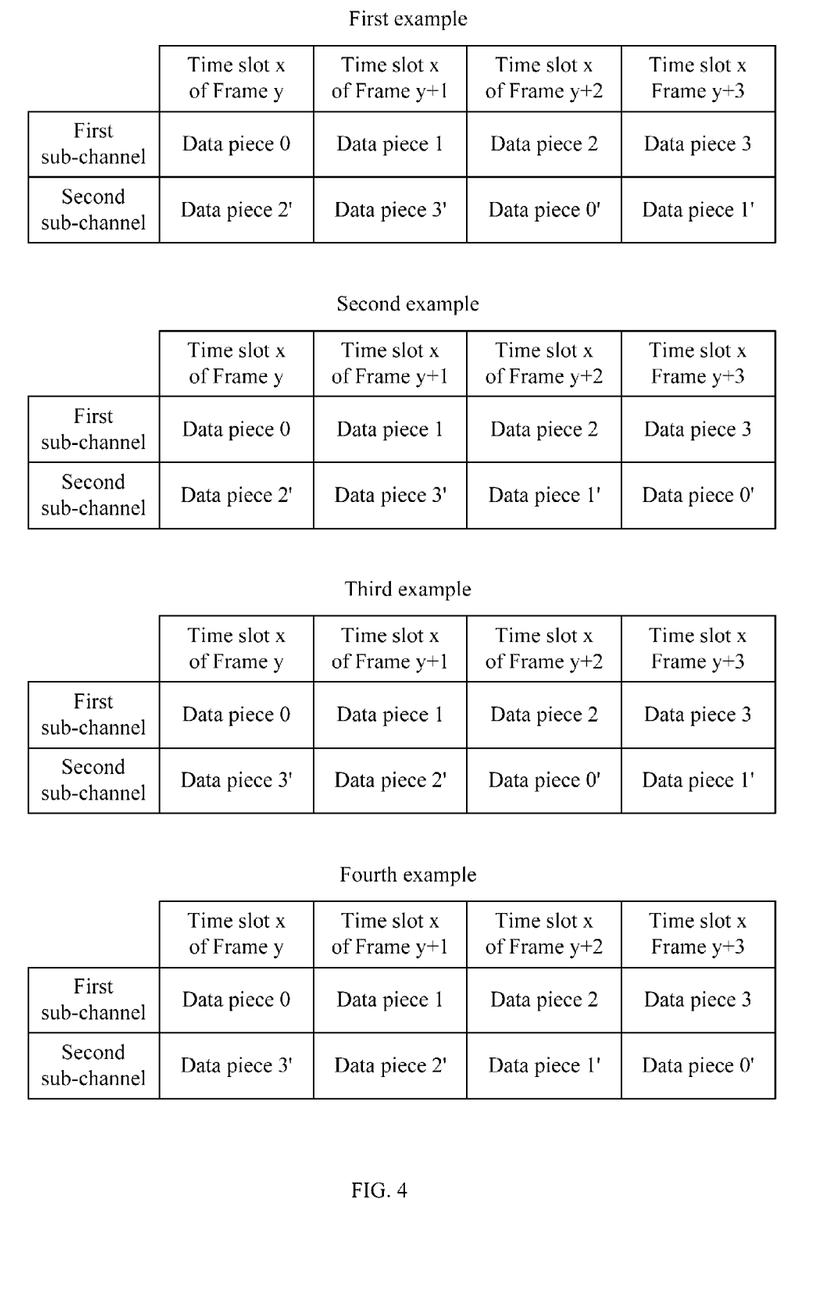
FIGS. 4 and 5 show some exemplary ways of fitting divergent copies of a data segment into bursts within time slot x of several frames.

For example, if the first and second sub-channels are full-rate traffic channels (e.g. TCH/F), the data segment may be voice data that contains data pieces 0~3. Each of the four data pieces includes encoded bits to be fit into a normal burst. In this example, data pieces 0 and 1 constitute the first half of the data segment, and data pieces 2 and 3 constitute the second half of the data segment. FIG. 4 shows 4 exemplary ways of fitting two divergent copies of the data segment into bursts within time slot x of several frames. Please note that data pieces 0'~3' transmitted through the second sub-channel may be transformed versions of data pieces 0~3, respectively, or be exactly the same as data pieces 0~3, respectively. If data pieces 0'~3' are derived through transformation, data pieces 0~3 may be derived by performing reverse transformation on data pieces 0'~3', respectively. Theoretically, the MS 140 should be able to recreate the data segment if it has data pieces 0, 1, 2', and 3'. If the MS 140 has both data pieces 0~3 and data pieces 0'~3', the recreated data segment may have fewer errors.

Figure 5:
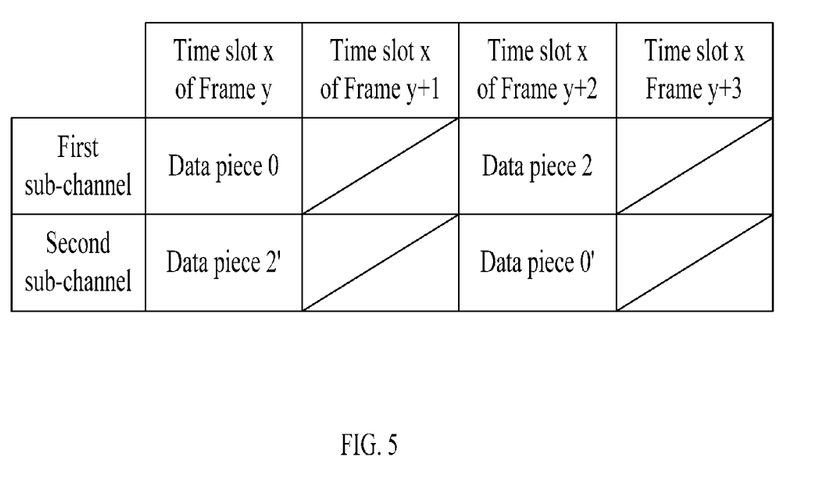

As another example, if the first and second sub-channels are half-rate traffic channels (e.g. TCH/H), the data segment may be voice data that contains data pieces 0 and 2. Each of the data pieces includes encoded bits to be fit into a normal burst. In this example, data piece 0 constitutes the first half of the data segment, and data piece 2 constitutes the second half of the data segment. FIG. 5 shows an exemplary way of fitting two divergent copies of the data segment into bursts within time slot x of several frames. Please note that data pieces 0' and 2' transmitted through the second sub-channel may be transformed versions of data pieces 0 and 2, respectively, or be exactly the same as data pieces 0 and 2, respectively. If data pieces 0' and 2' are derived through transformation, data pieces 0 and 2 may be derived by performing reverse transformation on data pieces 0' and 2', respectively. Theoretically, the MS 140 should be able to recreate the data segment if it has data pieces 0 and 2'. If the MS 140 has both data pieces 0 and 2 and data pieces 0' and 2', the recreated data segment may have fewer errors. In FIG. 5, slot number x of frames y+1 and y+3 may be used by another mobile station or two other mobile stations.

Please note that the encoded bits of each of the data pieces depicted in FIG. 4 and FIG. 5 need to be combined with other bits, such as tail bits and training sequence bits, to form a normal burst. The bursts transmitted to the MS 140 through the first sub-channel may be referred to as primary bursts, which are used by the BTS 120 to convey a first copy of the data segment to the MS 140. The bursts transmitted to the MS 140 through the second sub-channel may be referred to as auxiliary bursts, which are used by the BTS 120 to convey a second copy of the data segment to the MS 140. The first and the second copies contain the same information and are two divergent copies of the data segment.

Figure 6:
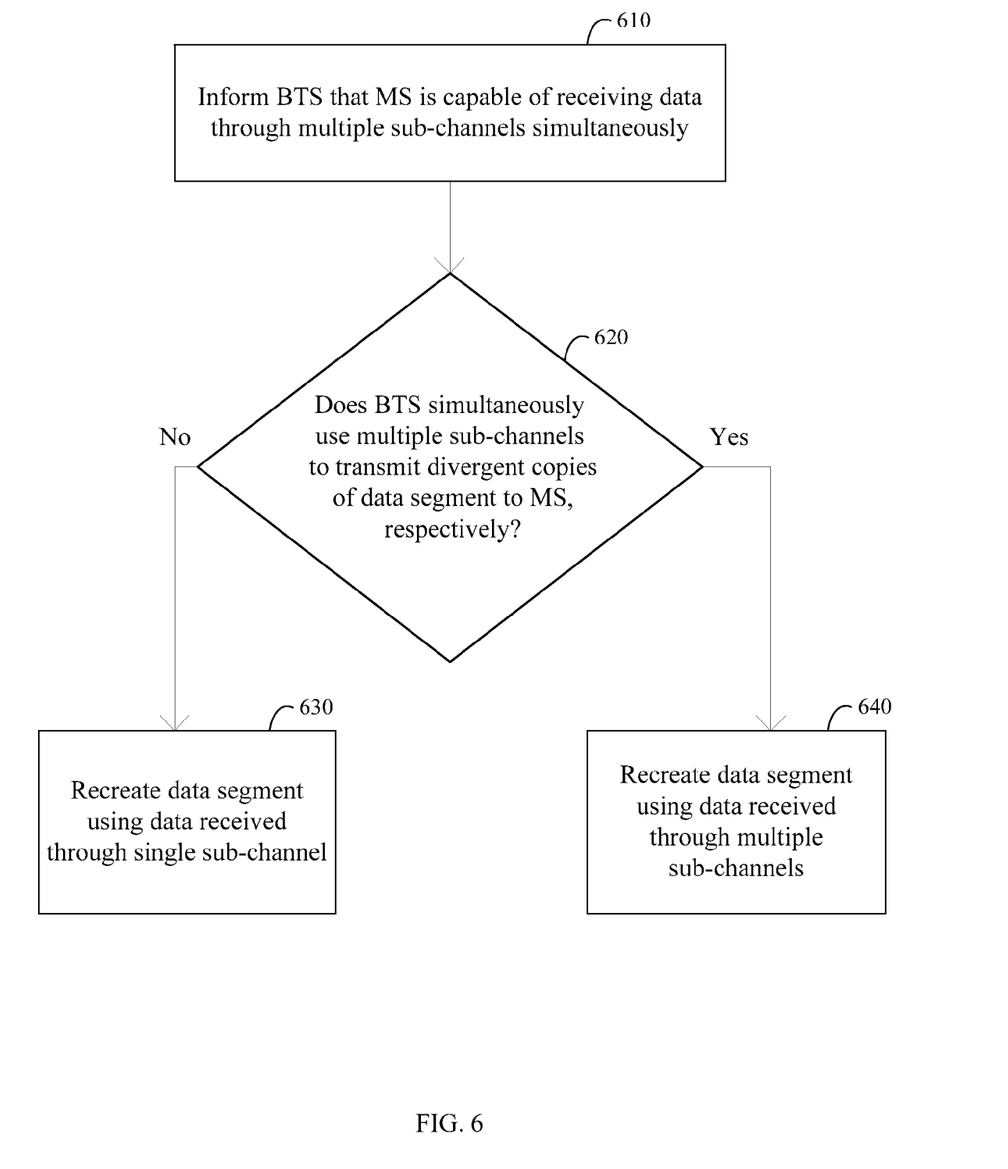

FIG. 6 shows a simplified flowchart of a method performed by the MS 140. This simplified flowchart includes only steps substantially related to the invention; other steps are omitted therefrom to avoid distraction. First, at step 610, the MS 140 informs the BTS 120 that it is capable of receiving data through multiple sub-channels simultaneously. For example, step 610 may be performing during a procedure in which the MS 140 camps on the BTS 120.

Then, at step 620, the MS 140 determines whether the BTS 120 simultaneously uses multiple sub-channels to transmit divergent copies of a data segment to the MS 140, respectively. Using FIG. 2 as an example, the multiple sub-channels may include the first and second sub-channels of slot number x. If the answer is no, the MS 140 enters step 630; otherwise, it enters step 640.

At step 630, the MS 140 recreate the data segment using data received through a single sub-channel, instead of multiple sub-channels. For example, the MS 140 may receive primary bursts from the BTS 120 through either the first or the second sub-channel, but not both, and the MS 140 may recreate the data segment using the content of the primary bursts.

At step 640, the MS 140 recreate the data segment using data simultaneously received through the multiple sub-channels. For example, while the MS 140 is performing step 640, the BTS 120 may transmit bursts to the MS 140 in one of the manners depicted in FIG. 4 and FIG. 5.

At Step 640, the MS 140 may advance the time of recreating the data segment completely. Specifically, the MS 140 may recreate the data segment using a first part of a first copy of the data segment received through the first sub-channel and a first part of a second copy the data segment received through the second sub-channel. Then, the MS may disregard the remaining part of the first copy and the remaining part of the second copy. For example, if the first part of the first copy contains data pieces 0 and 1 and the first part of the second copy contains data pieces 2' and 3', the disregarded remaining part of the first copy will contain data pieces 2 and 3, while the disregarded remaining part of the second copy will contain data pieces 0' and 1'. As another example, if the first part of the first copy contains data pieces 0, 1, and 2 and the first part of the second copy contains data pieces 2', 3', and 0', the disregarded remaining part of the first copy will contain data pieces 3, while the disregarded remaining part of the second copy will contain data pieces 1'.

Using the first exemplary data piece arrangement shown in FIG. 4 as an example, the MS 140 may be able to recreate the data segment completely after receiving the bursts within time slot x of frame y+1, or the bursts within time slot x of frame y+2, and need not wait until the reception of bursts within time slot x of frame y+3. Specifically, after receiving the bursts within time slot x of frame (y+1)/(y+2), the MS 140 may already have all the information (including at least data pieces 0, 1, 2', and 3') that is needed to recreate the data segment. If this is true, the MS 140 may recreate the data segment right away, and may disregard the subsequently burst(s) that are redundant. By disregarding time slot x of both frames y+2 and y+3 or of frame y+3 alone the MS 140 may have longer off duration of DRX and save more power. In other words, the MS 140 may have a further reduced receiver duty cycle and hence consume less power.

On the other hand, if the MS 140 tries to use the multiple sub-channels to receive each of the divergent copies of the data segment completely, it may have a better chance of recreating the data segment correctly. Specifically, because each encoded bit has been transmitted twice, probably several milliseconds apart, it should be more likely that the MS 140 may recreate the encoded bit correctly. Using the first exemplary data piece arrangement shown in FIG. 4 as an example, if the MS 140 is not confident enough as to what a specific encoded bit of the primary burst within time slot x of frame y is, it still has another chance to find out what that bit is using the auxiliary burst within time slot x of frame y+2.

For example, after receiving the primary burst within time slot x of frame y, the MS 140 may have a first soft bit for a specific encoded bit of data piece 0. After receiving the auxiliary burst within time slot x of frame y+2, the MS 140 may have a second soft bit for that specific encoded bit of data piece 0. The MS 140 may then derive the specific encoded bit by combining the first and second soft bits, both of which correspond to the specific encoded bit. Because time slot x of frame y and time slot x of frame y+2 may be several milliseconds apart, it's less likely that both the first and second soft bits are incorrect. In other words, the data pieces 0 and 0', as received, may help the MS 140 to recreate every encoded bit contained in data piece 0 more correctly.

Figure 7:
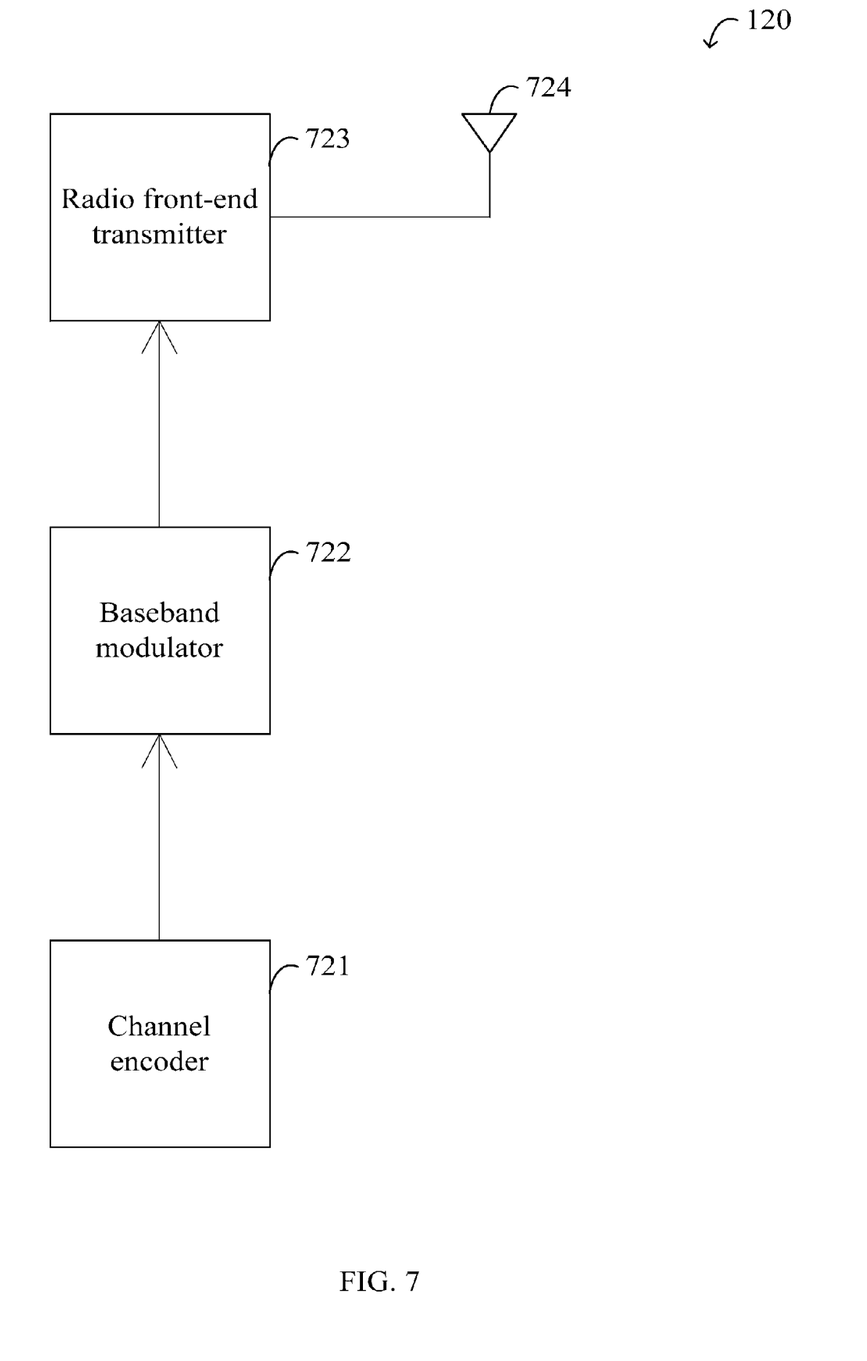
FIG. 7 and FIG. 8 show two exemplary block diagrams of the two apparatuses of FIG. 1, respectively.
Figure 8:
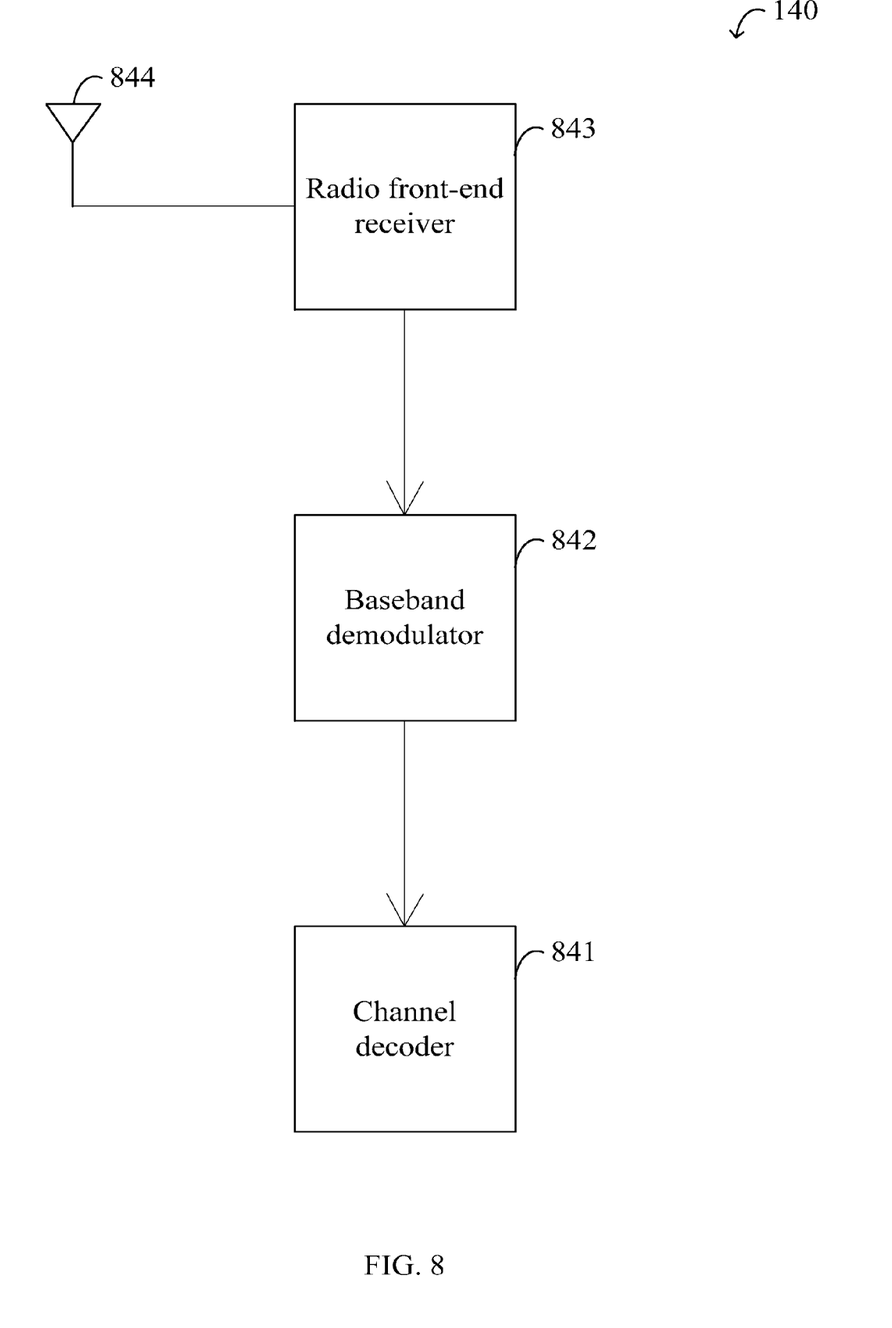

FIG. 7 and FIG. 8 show exemplary block diagrams of the BTS 120 and the MS 140 of FIG. 1, respectively. Please refer to FIG. 7 first. In addition to other functional blocks not depicted therein, the BTS 120 of this embodiment includes a channel encoder 721, a baseband modulator 722, a radio front-end transmitter 723, and an antenna 724. To protect the data to be transmitted to a mobile station (e.g. the MS 140) against errors, the channel encoder 721 converts the data into encoded bits that allow error correction, such as forward error correction. For example, the channel encoder 721 may generate encoded bits through convolutional coding and interleaving.

Using AQPSK (Adaptive Quadrature Phase Shift Keying) modulation or another modulation technique, the baseband modulator 722 generated modulated signals based on the encoded bits along with some other bits, such as tail bits and training sequence bits combined with the encoded bits to form bursts. For example, if at step 320 the BTS 120 determines that only one of the in-phase and quadrature-phase sub-channels is available for the MS 140, the baseband modulator 722 may modulate the primary bursts for the MS 140 onto the available sub-channel at step 330. On the other hand, if at step 320 the BTS 120 determines that the in-phase and quadrature-phase sub-channels are both available for the MS 140, the baseband modulator 722 may modulate the primary bursts for the MS 140 onto one of the sub-channels and the auxiliary bursts onto the other of the sub-channels at step 340.

The radio front-end transmitter 723 then generates RF signals by up-converting the modulated signals provided by the baseband modulator 722 onto the carrier frequency. The RF signals are then passed to the antenna 724 for transmission.

Please refer to FIG. 8. In addition to other functional blocks not depicted therein, the MS 140 of this embodiment includes a channel decoder 841, a baseband demodulator 842, a radio front-end receiver 843, and an antenna 844. The antenna 844 receives RF signals and passes the RF signals to the radio front-end receiver 843. The radio front-end receiver 843 then generates modulated signals by down-converting the RF signals to the baseband domain.

Using AQPSK demodulation or another demodulation technique, the baseband demodulator 842 demodulates the modulated signals to generate bursts that encompass encoded bits. For example, if at step 620 the MS 140 determines that the BTS 120 is transmitting primary bursts to the MS 140 using only one of the in-phase and quadrature-phase sub-channels, the baseband demodulator 842 may demodulate the modulated signals to recreate the primary bursts at step 630. The baseband demodulator 842 may then recreate the data segment based on the primary bursts alone.

On the other hand, if at step 620 the MS 140 determines that the BTS 120 is transmitting primary bursts and auxiliary bursts to the MS 140 using the in-phase and quadrature-phase sub-channels, the baseband demodulator 842 may demodulate the modulated signals to recreate at least half of the primary bursts and at least half of the auxiliary bursts at step 640. The baseband demodulator 842 may then recreate the data segment based on the derived primary and auxiliary bursts.

Next, the channel decoder 841 recreates the data provided by the BTS 120 to the MS 140 based on the data segment provided by the baseband demodulator 842. For example, the channel decoder 841 may recreate the data provided by the BTS 120 through de-interleaving and convolutional decoding.

Figure 9:
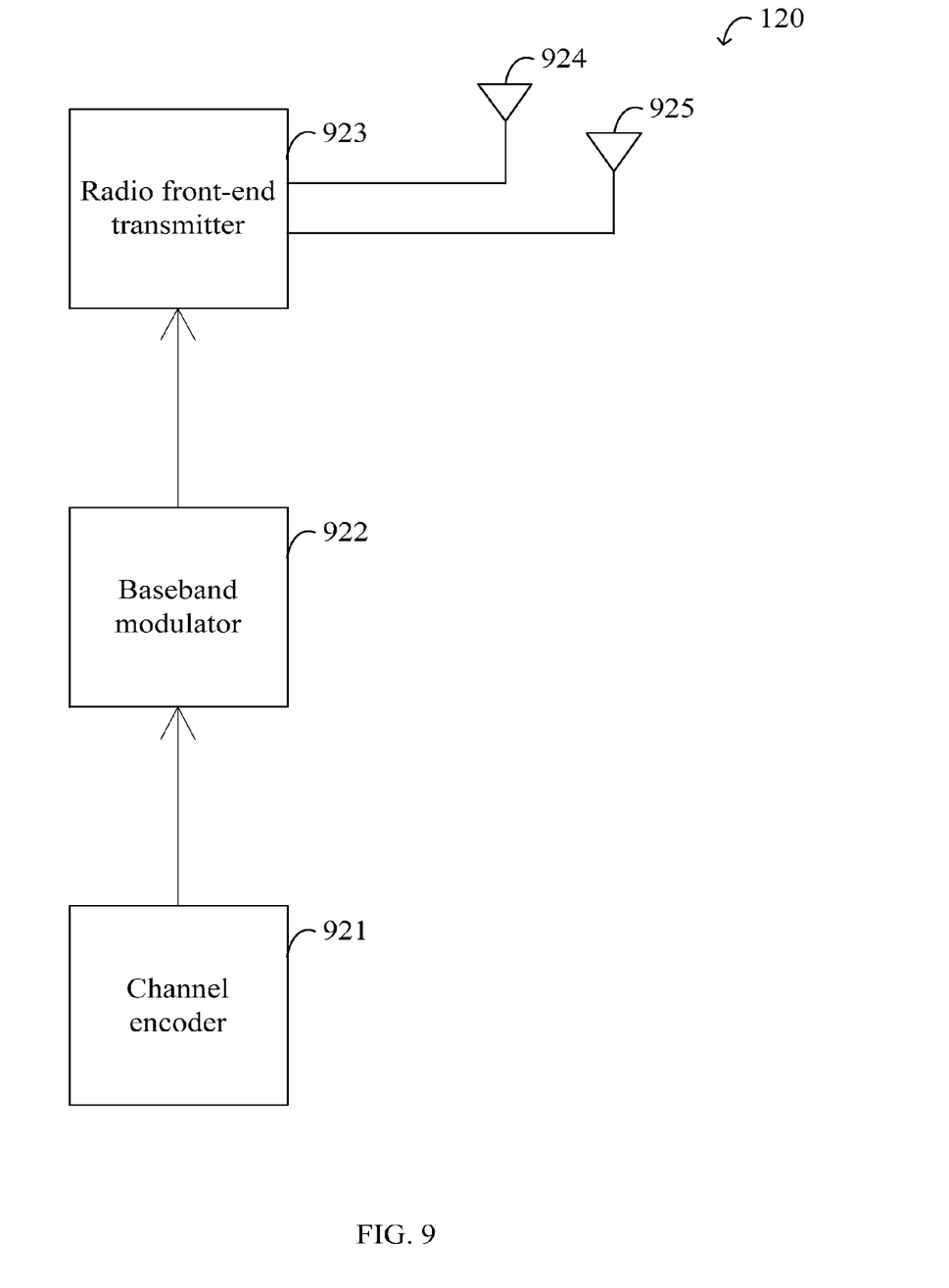
FIG. 9 and FIG. 10 show two other exemplary block diagrams of the two apparatuses of FIG. 1, respectively.
Figure 10:
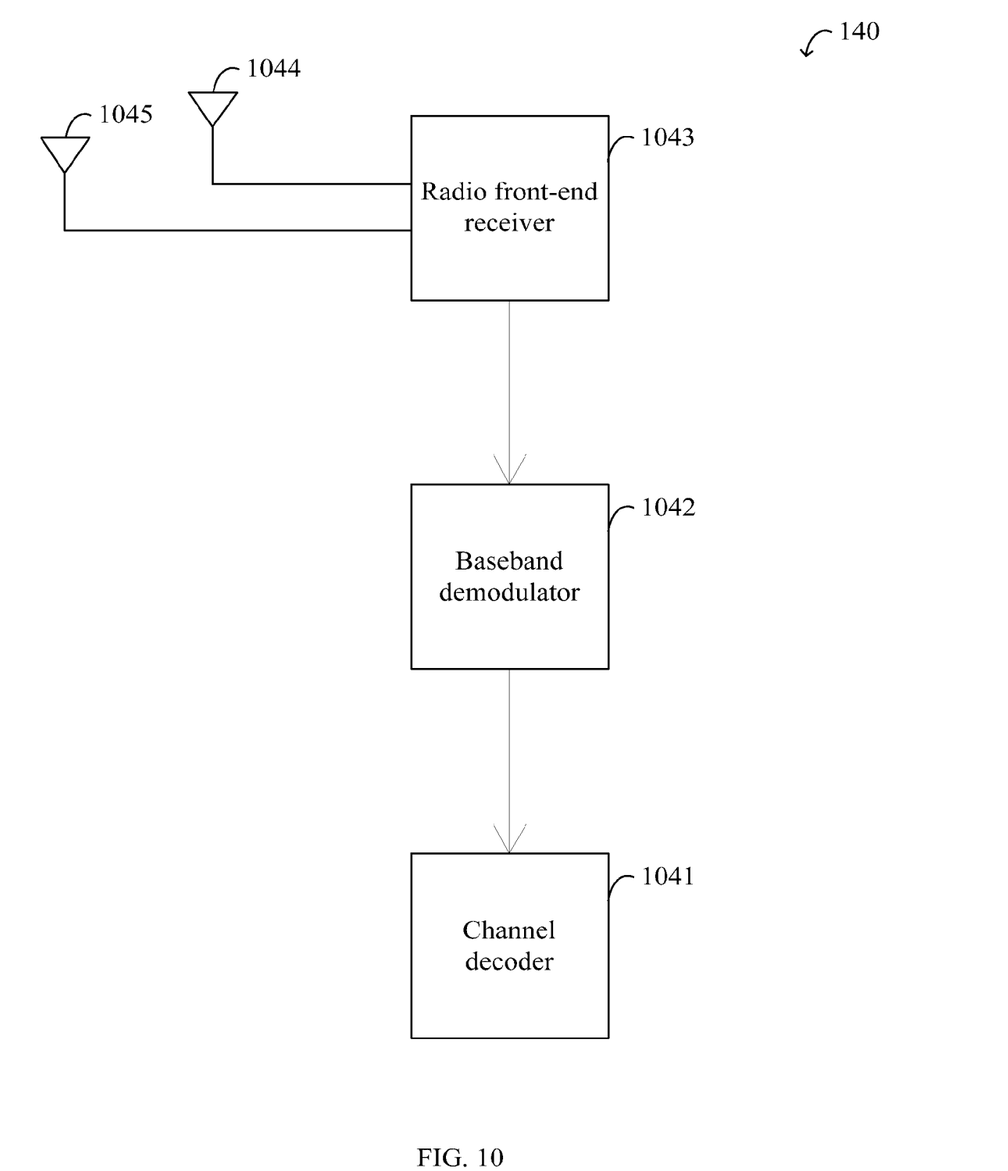

FIG. 9 and FIG. 10 show exemplary block diagrams of the BTS 120 and the MS 140 of FIG. 1, respectively. Because each of the BTS 120 and the MS 140 has two antennas, they constitute a MIMO (multiple-input and multiple-output) radio system, specifically, a two-input and two-output radio system.

Please refer to FIG. 9 first. In addition to other functional blocks not depicted therein, the BTS 120 of this embodiment includes a channel encoder 921, a baseband modulator 922, a radio front-end transmitter 923, a first antenna 924, and a second antenna 925. The first antenna 924 and the second antenna 925 are responsible for transmitting RF signals on the first and second sub-channels, respectively.

To protect the data to be transmitted to a mobile station (e.g. the MS 140) against errors, the channel encoder 921 converts the data into encoded bits that allow error correction, such as forward error correction. For example, the channel encoder 921 may generate encoded bits through convolutional coding and interleaving.

Using GMSK (Gaussian Minimum-Shift Keying)/QPSK (Quadrature Phase Shift Keying)/8PSK (8 Phase Shift Keying)/QAM (Quadrature Amplitude Modulation) modulation or another modulation technique, the baseband modulator 922 generated modulated signals based on the encoded bits along with some other bits, such as tail bits and training sequence bits combined with the encoded bits to form bursts. For example, if at step 320 the BTS 120 determines that only one of the first and second sub-channels is available for the MS 140, the baseband modulator 922 may modulate the primary bursts for the MS 140 onto the available sub-channel at step 330. On the other hand, if at step 320 the BTS 120 determines that the first and second sub-channels are both available for the MS 140, the baseband modulator 922 may modulate the primary bursts for the MS 140 onto one of the sub-channels and the auxiliary bursts onto the other of the sub-channels at step 340.

The radio front-end transmitter 923 then generates RF signals by up-converting the modulated signals provided by the baseband modulator 922 onto the carrier frequency. The RF signals are then passed to the antennas 924 and 925, respectively, for transmission.

Please refer to FIG. 10. In addition to other functional blocks not depicted therein, the MS 140 of this embodiment includes a channel decoder 1041, a baseband demodulator 1042, a radio front-end receiver 1043, a first antenna 1044, and a second antenna 1045. The first and second antennas 1044 and 1045 receive RF signals and pass the RF signals to the radio front-end receiver 1043. The radio front-end receiver 1043 then generates modulated signals by down-converting the RF signals to the baseband domain.

Using GMSK/QPSK/8PSK/QAM demodulation or another demodulation technique, the baseband demodulator 1042 demodulates the modulated signals to generate bursts that encompass encoded bits. For example, if at step 620 the MS 140 determines that the BTS 120 is transmitting primary bursts to the MS 140 using only one of the first and second sub-channels, the baseband demodulator 1042 may demodulate the modulated signals to recreate the primary bursts for the MS 140 at step 630. Then, the baseband demodulator 1042 may recreate the data segment based on the primary bursts.

On the other hand, if at step 620 the MS 140 determines that the BTS 120 is transmitting primary bursts and auxiliary bursts to the MS 140 using the first and second sub-channels, the baseband demodulator 1042 may demodulate the modulated signals to derive at least half of the primary bursts and at least half of auxiliary bursts at step 640. Then, the baseband demodulator 1042 may recreate the data segment based on the derived primary and auxiliary bursts.

Next, the channel decoder 1041 recreates the data provided by the BTS 120 to the MS 140 based on the encoded bits within the data segment provided by the baseband demodulator 1042. For example, the channel decoder 1041 may recreate the data through de-interleaving and convolutional decoding.

One of the advantages of the aforementioned embodiments it that they may reduce the MS 140's power consumption and prolong its battery life. Another of the advantages is that the embodiments may allow the multiple sub-channels to be used more efficiently, e.g. to reduce errors.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A method performed by a first wireless communication apparatus in communicating with a second wireless communication apparatus, the method comprising:
   determining whether a plurality of sub-channels are simultaneously available for the second wireless communication apparatus; and
   simultaneously using the sub-channels to transmit a plurality of copies of a data segment to the second wireless communication apparatus, respectively, if the sub-channels are simultaneously available for the second wireless communication apparatus;
wherein the sub-channels comprise a first sub-channel and a second sub-channel, and the step of simultaneously using the sub-channels to transmit the copies of the data segment to the second wireless communication apparatus, respectively, comprises:
  simultaneously using the first and second sub-channels to transmit a first half and a second half of the data segment, respectively, to the second wireless communication apparatus; and
  simultaneously using the first and second sub-channels to transmit the second and first halves of the data segment, respectively, to the second wireless communication apparatus.

2. The method of claim 1, wherein the data segment comprises a plurality of data pieces, and the copies of the data segment comprise the data pieces in different sequences.

3. The method of claim 1, wherein the sub-channels comprises an in-phase sub-channel and a quadrature-phase sub-channel of AQPSK (Adaptive Quadrature Phase Shift Keying) modulation.

4. The method of claim 1, wherein the sub-channels comprises a first sub-channel between a first antenna of the first wireless communication apparatus and a first antenna of the second wireless communication apparatus, and a second sub-channel between a second antenna of the first wireless communication apparatus and a second antenna of the second wireless communication apparatus.

5. The method of claim 1, further comprising:
  being informed by the second wireless communication apparatus that the second wireless communication apparatus is capable of receiving data through multiple sub-channels simultaneously.

6. A method performed by a second wireless communication apparatus in communicating with a first wireless communication apparatus, the method comprising:
  informing the first wireless communication apparatus that the second wireless communication apparatus is capable of receiving data through multiple sub-channels simultaneously;
  determining whether the first wireless communication apparatus simultaneously uses a plurality of sub-channels to transmit a plurality of copies of a data segment to the second wireless communication apparatus, respectively; and
  recreating the data segment based on data received through the sub-channels if the first wireless communication apparatus simultaneously uses the sub-channels to transmit the copies of the data segment to the second wireless communication apparatus, respectively;
wherein the sub-channels comprise a first sub-channel and a second sub-channel, the copies of the data segment comprise a first copy transmitted through the first sub-channel and a second copy transmitted through the second sub-channel, and the step of recreating the data segment based on data received through the sub-channels comprises:
  recreating the data segment using a first part of the first copy and a first part of the second copy; and
  disregarding a remaining part of the first copy and a remaining part of the second copy.

7. The method of claim 6, wherein the data segment comprises a plurality of data pieces, and the copies of the data segment comprise the data pieces in different sequences.

8. The method of claim 6, wherein the sub-channels comprise a first sub-channel and a second sub-channel, the copies of the data segment comprise a first copy transmitted through the first sub-channel and a second copy transmitted through the second sub-channel, and the step of recreating the data segment based on data received through the sub-channels comprises:
  recreating an encoded bit of the data segment by combing a first soft bit of the first copy and a second soft bit of the second copy, wherein both the first and second soft bits correspond to the encoded bit.

9. The method of claim 6, wherein the sub-channels comprises an in-phase sub-channel and a quadrature-phase sub-channel of AQPSK (Adaptive Quadrature Phase Shift Keying) modulation.

10. The method of claim 6, wherein the sub-channels comprises a first sub-channel between a first antenna of the first wireless communication apparatus and a first antenna of the second wireless communication apparatus, and a second sub-channel between a second antenna of the first wireless communication apparatus and a second antenna of the second wireless communication apparatus.

11. A wireless communication apparatus for communicating with a remote wireless communication apparatus, comprising:
  a channel encoder, configured to generated a data segment of encoded bits for the remote wireless communication apparatus;
  a baseband modulator, coupled to the channel encoder, configured to generate a plurality of modulated signals for a plurality of sub-channels when the sub-channels are available for the remote wireless communication apparatus, wherein the modulated signals represent a plurality of copies of the data segment, respectively; and
  a radio front-end transmitter, coupled to the baseband modulator, configured to generate RF signals for transmission by up-converting the modulated signals;
wherein the wireless communication apparatus is configured to determine during a camp-on procedure whether the remote wireless communication apparatus is capable of receiving data through multiple sub-channels simultaneously;
wherein the sub-channels comprise a first sub-channel and a second sub-channel, and the first and second sub-channels are used simultaneously to transmit a first half and a second half of the data segment, respectively, to the remote wireless communication apparatus; and
the first and second sub-channels are used simultaneously to transmit the second and first halves of the data segment, respectively, to the remote wireless communication apparatus.

12. The wireless communication apparatus of claim 11, wherein the data segment comprises a plurality of data pieces, and the copies of the data segment comprise the data pieces in different sequences.

13. The wireless communication apparatus of claim 11, wherein the sub-channels comprises an in-phase sub-channel and a quadrature-phase sub-channel of AQPSK (Adaptive Quadrature Phase Shift Keying) modulation.

14. The wireless communication apparatus of claim 11, wherein the sub-channels comprises a first sub-channel between a first antenna of the wireless communication apparatus and a first antenna of the remote wireless communication apparatus, and a second sub-channel between a second antenna of the wireless communication apparatus and a second antenna of the remote wireless communication apparatus.

15. A wireless communication apparatus for communicating with a remote wireless communication apparatus, comprising:

a radio front-end receiver, configured to generate a plurality of modulated signals by down-converting a plurality of received RF signals;

a baseband demodulator, coupled to the radio front-end receiver, configured to recreate a data segment of encoded bits based on the modulated signals if the modulated signals represent a plurality of copies of the data segment; and a channel decoder, coupled to the baseband demodulator, configured to decode the data segment;

wherein the wireless communication apparatus is configured to inform the remote wireless communication apparatus during a camp-on procedure that the wireless communication apparatus is capable of receiving data through multiple sub-channels simultaneously;

wherein the sub-channels comprise a first sub-channel and a second sub-channel, the copies of the data segment comprise a first copy transmitted through the first sub-channel and a second copy transmitted through the second sub-channel, and the baseband demodulator is configured to:

recreate the data segment using a first part of the first copy and a first part of the second copy; and disregard a remaining part of the first copy and a remaining part of the second copy.

16. The wireless communication apparatus of claim 15, wherein the data segment comprises a plurality of data pieces, and the copies of the data segment comprise the data pieces in different sequences.

17. The wireless communication apparatus of claim 15, wherein the sub-channels comprise a first sub-channel and a second sub-channel, the copies of the data segment comprise a first copy transmitted through the first sub-channel and a second copy transmitted through the second sub-channel, and the baseband demodulator is configured to:

recreate an encoded bit of the data segment by combing a first soft bit of the first copy and a second soft bit of the second copy, wherein both the first and second soft bits correspond to the encoded bit.

18. The wireless communication apparatus of claim 15, wherein the sub-channels comprises an in-phase sub-channel and a quadrature-phase sub-channel of AQPSK (Adaptive Quadrature Phase Shift Keying) modulation.

19. The wireless communication apparatus of claim 15, wherein the sub-channels comprises a first sub-channel between a first antenna of the wireless communication apparatus and a first antenna of the remote wireless communication apparatus, and a second sub-channel between a second antenna of the wireless communication apparatus and a second antenna of the remote wireless communication apparatus.

* * * * *